United States Patent
Schleif et al.

(10) Patent No.: US 12,339,113 B2
(45) Date of Patent: Jun. 24, 2025

(54) APPARATUS AND METHOD FOR TRANSMITTING RADIATION TO A ROTATING COMPONENT

(71) Applicant: General Electric Company, Schenectady, NY (US)

(72) Inventors: Kurt Kramer Schleif, Greenville, SC (US); Michael Allen Ball, Greer, SC (US); Andrew David Ellis, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 312 days.

(21) Appl. No.: 17/810,071

(22) Filed: Jun. 30, 2022

(65) Prior Publication Data
US 2024/0003678 A1 Jan. 4, 2024

(51) Int. Cl.
*G01B 11/14* (2006.01)
*F01D 17/02* (2006.01)
*F01D 21/00* (2006.01)
*G02B 5/04* (2006.01)

(52) U.S. Cl.
CPC .............. *G01B 11/14* (2013.01); *F01D 17/02* (2013.01); *F01D 21/003* (2013.01); *G02B 5/045* (2013.01); *F05D 2270/804* (2013.01)

(58) Field of Classification Search
CPC ..... G01B 11/026; G01B 11/14; F01D 21/003; F01D 11/14; F01D 11/20; F01D 17/02; G02B 5/045; F05D 2270/80; F05D 2270/804
See application file for complete search history.

(56) References Cited

U.S. PATENT DOCUMENTS

| | | | |
|---|---|---|---|
| 3,865,564 A | 2/1975 | Jaeger et al. | |
| 4,049,349 A | 9/1977 | Wennerstrom | |
| 4,357,104 A * | 11/1982 | Davinson | G01B 11/14 |
| | | | 250/559.38 |

(Continued)

FOREIGN PATENT DOCUMENTS

| | | |
|---|---|---|
| DE | 102012112644 A1 | 6/2014 |
| WO | 2014096157 A1 | 6/2014 |

OTHER PUBLICATIONS

Non-Final Office Action in U.S. Appl. No. 17/810,073, mailed Apr. 10, 2024, 31 pages.

(Continued)

*Primary Examiner* — Gordon J Stock, Jr.
(74) *Attorney, Agent, or Firm* — James Pemrick; Charlotte Wilson; Hoffman Warnick LLC

(57) ABSTRACT

An apparatus and method for radiation measurement are used to determine clearance of a rotating gas turbine component. The apparatus includes a probe body on a stationary component outward of the rotating component and a pair of sensor assemblies coupled to the probe body. Each sensor assembly includes a plurality of prisms coupled to the probe body Each prism of the plurality of prisms has a distinct angular orientation to direct radiation from the focusing lens to the rotating component surface off-axis with respect to an axis of the respective radiation source of the pair of radiation sources and with less directional variation than radiation from the respective radiation source.

20 Claims, 13 Drawing Sheets

(56) References Cited

U.S. PATENT DOCUMENTS

| | | | |
|---|---|---|---|
| 4,765,742 A * | 8/1988 | Davinson | G01B 11/14 356/624 |
| 4,806,016 A | 2/1989 | Corpron et al. | |
| 4,850,686 A * | 7/1989 | Morimoto | G02B 26/0891 359/837 |
| 5,557,099 A | 9/1996 | Zielinski et al. | |
| 6,473,250 B1 * | 10/2002 | Chapman | G02B 26/0883 359/837 |
| 7,352,512 B2 * | 4/2008 | Seiden | G02B 27/0972 359/833 |
| 7,619,728 B2 * | 11/2009 | Ogburn | G02B 23/26 250/370.11 |
| 7,941,281 B2 | 5/2011 | Rai et al. | |
| 8,009,939 B2 * | 8/2011 | Zheng | G01B 11/14 385/139 |
| 8,042,412 B2 * | 10/2011 | Xia | G01L 3/12 73/800 |
| 8,164,761 B2 * | 4/2012 | Kominsky | F01D 21/003 250/559.22 |
| 8,431,917 B2 * | 4/2013 | Wang | G02B 26/108 250/559.07 |
| 8,553,237 B2 * | 10/2013 | Kominsky | G01B 11/026 356/625 |
| 8,654,315 B2 * | 2/2014 | Kominsky | F01D 21/003 356/5.1 |
| 9,593,941 B2 * | 3/2017 | John | G01B 11/14 |
| 10,024,761 B2 * | 7/2018 | Cornes | G01M 15/14 |
| 10,488,182 B2 * | 11/2019 | Onishi | G01B 11/14 |
| 10,605,108 B2 * | 3/2020 | Miyamoto | F01D 11/22 |
| 10,760,897 B2 * | 9/2020 | Kondou | F01D 21/003 |
| 10,816,324 B2 * | 10/2020 | Fukuyama | G01B 11/14 |
| 11,073,378 B2 * | 7/2021 | Fukuyama | F02C 7/00 |
| 11,255,660 B2 * | 2/2022 | Kondou | F01D 25/24 |
| 2004/0085526 A1 | 5/2004 | Gogolla et al. | |
| 2007/0229839 A1 * | 10/2007 | Franz | G02B 26/0883 356/477 |
| 2010/0168981 A1 | 7/2010 | Kominsky | |
| 2011/0058182 A1 | 3/2011 | Dubin et al. | |
| 2012/0182563 A1 | 7/2012 | Kominsky | |
| 2014/0356132 A1 | 12/2014 | Leroux et al. | |
| 2017/0268376 A1 | 9/2017 | Bailey et al. | |
| 2018/0328721 A1 | 11/2018 | Hatcher, Jr. et al. | |
| 2019/0018088 A1 | 1/2019 | Hu et al. | |
| 2022/0357430 A1 * | 11/2022 | Merschdorf | G01S 7/4818 |
| 2024/0003679 A1 * | 1/2024 | Schleif | F01D 11/14 |

OTHER PUBLICATIONS

European Search Report for corresponding EP Application No. 23178800.1 dated Oct. 25, 2023, 11 pages.

European Search Report for corresponding EP Application No. 23178798.7 dated Oct. 25, 2023, 10 pages.

European Search Report from European Patent Application No. 24201048.6 dated Feb. 6, 2025; 9 Pages.

Kim, Myun-Sik et al.; "Refraction limit of miniaturized optical systems: a ball-lens example"; Optics Express 6996; vol. 24; No. 7; Apr. 4, 2016; Copyright 2016 OSA; p. 10.

* cited by examiner

APPARATUS AND METHOD FOR TRANSMITTING RADIATION TO A ROTATING COMPONENT

TECHNICAL FIELD

Embodiments of the disclosure relate generally to analysis of components and, more specifically, to an apparatus and method for transmitting radiation to a rotating component (e.g., a rotating blade of a gas turbine) to determine its location relative to a stationary component (e.g., a casing of the gas turbine).

BACKGROUND

In the manufacturing and servicing of turbomachinery, it may be desirable to measure the distance between the tip of a rotating blade, or other similarly situated component, and the inner surface of the stationary casing of the machine where the component is installed. Although such components should be kept out of contact with the casing, smaller distances between the casing and component may improve various operational aspects of the turbomachine (e.g., efficiency and performance). Measuring this distance also may be relevant to product validation, health monitoring of the turbomachine, accuracy of feedback in control systems, and/or product diagnostics.

Capacitance probes have been used in some cases to measure the distance between a component and the surrounding casing. However, some capacitance probes may be unreliable when manufactured to certain dimensions. These possible issues may be more pronounced with elevated firing temperatures, certain vibration limits, and user-defined quality constraints. A separate concern is maintaining structural integrity of the measurement assembly, e.g., maintaining probe operability in a variety of power generation modes.

Other types of probes, such as radiation-based probes, may address some of these concerns but introduce other technical challenges. In the case of radiation-based probes, the geometry of the component(s) being measured may not be compatible with the device(s) used for sending or receiving the radiation. For instance, some surface(s) may not be positioned to deflect radiation and/or may direct the radiation away from the component(s) for detecting the radiation.

BRIEF SUMMARY

Aspects of the disclosure include a probe assembly for transmitting radiation from a pair of radiation sources to a rotating component surface, the probe assembly including: a probe body on a stationary component; a pair of sensor assemblies coupled to the probe body, each sensor assembly including: a plurality of prisms coupled to the probe body, each prism of the plurality of prisms having a distinct angular orientation to direct radiation from a respective radiation source of the pair of radiation sources to the rotating component surface off-axis with respect to an axis of the respective radiation source of the pair of radiation sources and with less directional variation than radiation from the respective radiation source.

Another aspect of the disclosure includes any of the preceding aspects, further including a focusing lens coupled to the probe body and optically coupled between a respective radiation source of the pair of radiation sources and a respective plurality of prisms.

Another aspect of the disclosure includes any of the preceding aspects, and wherein the focusing lens includes a set of axially opposed rounded edges.

Another aspect of the disclosure includes any of the preceding aspects, wherein the radiation source includes an optical fiber, and wherein a focusing lens is coupled to an output end of the optical fiber.

Another aspect of the disclosure includes any of the preceding aspects, further including a purge fluid passage within the probe body, wherein the purge fluid passage fluidly couples a purge fluid source to the plurality of prisms.

Another aspect of the disclosure includes any of the preceding aspects, wherein the plurality of prisms is configured to direct the radiation from the respective radiation source along a pathway that is approximately twenty degrees from a centerline axis of the probe body.

Another aspect of the disclosure includes any of the preceding aspects, wherein each of the plurality of prisms is a right-angle prism.

Another aspect of the disclosure includes any of the preceding aspects, wherein the rotating component surface is a surface of a rotating blade of a turbomachine; and wherein the probe body is coupled to the casing of the turbomachine and is positioned radially outward from the rotating blade.

Another aspect of the disclosure includes any of the preceding aspects, further including at least two light pipes, each light pipe coupled to the probe body and physically decoupled from each plurality of prisms, wherein each light pipe is positioned to detect the radiation after the radiation is deflected from the rotating component surface.

Further aspects of the disclosure include an apparatus for measuring a clearance within a turbomachine, the apparatus including: a probe assembly on a casing of a turbomachine, the probe assembly including: a probe body mounted to the casing; a pair of sensor assemblies coupled to the probe body, each sensor assembly including: a plurality of prisms coupled to the probe body, each prism of the plurality of prisms having a distinct angular orientation to direct radiation from a respective radiation source to a rotating component surface off-axis with respect to an axis of the respective radiation source and with less directional variation than the radiation from the respective radiation source; a detector for receiving radiation deflected from the rotating component surface; and a controller coupled to the detector, wherein the controller calculates the clearance as a distance between the probe assembly and the rotating component surface based on an elapsed time between detection of deflected radiation from a first radiation source and detection of deflected radiation from a second radiation source.

Another aspect of the disclosure includes any of the preceding aspects, wherein each sensor assembly further includes a focusing lens coupled to the probe body and optically coupled between a respective radiation source of the pair of radiation sources and a respective plurality of prisms.

Another aspect of the disclosure includes any of the preceding aspects, wherein the focusing lens includes a set of axially opposed rounded edges, the radiation source includes an optical fiber, and the focusing lens is coupled to an output end of the optical fiber.

Another aspect of the disclosure includes any of the preceding aspects, further including a purge fluid passage within the probe body, wherein the purge fluid passage fluidly couples a purge fluid source to the plurality of prisms.

Another aspect of the disclosure includes any of the preceding aspects, wherein the rotating component surface is a surface of a rotating blade of a turbomachine.

Still further aspects of the disclosure include a method for transmitting radiation to a surface of a rotating component, the method including: transmitting radiation from a pair of radiation sources through at least two sensor assemblies disposed in a probe body on a stationary component radially spaced from the rotating component, wherein each sensor assembly includes: a plurality of prisms coupled to the probe body, each prism having a distinct angular orientation such that the plurality of prisms directs radiation from a respective radiation source of the pair of radiation sources to the surface of the rotating component off-axis with respect to an axis of the respective radiation source and with less directional variation than the radiation from the respective radiation source; measuring one of an elapsed time or rotation distance between detection of deflected radiation from a first radiation source from the surface of the rotating component and detection of deflected radiation from a second radiation source from the surface of the rotating component; and calculating, via a controller, a clearance distance between the stationary component and the rotating component based on the elapsed time or the rotation distance.

Another aspect of the disclosure includes any of the preceding aspects, further including passing purge fluid from a passage within the probe body over the plurality of prisms to remove contaminants therefrom.

Another aspect of the disclosure includes any of the preceding aspects, wherein each sensor assembly of the at least two sensor assemblies further includes a focusing lens coupled to the probe body radially outward of the plurality of prisms; and wherein transmitting radiation from the pair of radiation sources through the at least two sensor assemblies further comprises directing the radiation through the respective focusing lens of each respective sensor assembly prior to directing the radiation through the plurality of prisms; and wherein directing the radiation through the plurality of prisms causes the radiation to be oriented along a pathway that is approximately twenty degrees from a centerline axis of the probe body.

Another aspect of the disclosure includes any of the preceding aspects, wherein the rotating component includes a blade of a turbomachine; and wherein the stationary component includes a casing of the turbomachine.

Another aspect of the disclosure includes any of the preceding aspects, further including mounting the probe body including the at least two sensor assemblies within the casing of the turbomachine radially outward of the rotating component.

Another aspect of the disclosure includes any of the preceding aspects, further including collecting radiation deflected from the surface of the rotating component in a pair of light pipes coupled to the probe body, wherein the pair of light pipes are physically decoupled from the at least two sensor assemblies.

Another aspect of the disclosure includes any of the preceding aspects, wherein each radiation source of the pair of radiation sources includes an optical fiber, and further comprising, for each sensor assembly, coupling a focusing lens to an output end of the optical fiber such that the radiation is directed through the focusing lens prior to be directed through the plurality of prisms.

Additional aspects of the disclosure include an apparatus for detecting radiation deflected from a rotating component, the apparatus including: a probe body on a stationary component radially outward of the rotating component; and a pair of arrival time sensors coupled to the probe body, each of the pair of arrival time sensors including: a light pipe coupled to the probe body and having a first end and a second end opposite the first end; wherein the first end of the light pipe receives radiation deflected from the rotating component, and wherein a shape of the light pipe reduces directional variation of the radiation at the second end relative to the first end; and a detector optically coupled to each respective light pipe; wherein the detector is positioned to receive the radiation with reduced directional variation from the light pipe.

Another aspect of the disclosure includes any of the preceding aspects, further including a controller coupled to the detector, wherein the controller calculates a clearance as a distance between the probe body and the rotating component based on one of an elapsed time or a rotation distance between detecting the deflected radiation in each of the pair of arrival time sensors.

Another aspect of the disclosure includes any of the preceding aspects, wherein each of the pair of arrival time sensors further includes a focusing lens optically coupled to the second end of the light pipe, the focusing lens shaped to direct the radiation from the light pipe to the detector.

Another aspect of the disclosure includes any of the preceding aspects, wherein the focusing lens includes a plano-convex lens substantially aligned with a centerline axis of the light pipe.

Another aspect of the disclosure includes any of the preceding aspects, wherein the shape of the light pipe and a polished reflective coating on internal surfaces of the light pipe induce total internal reflection on the radiation transmitted therethrough.

Another aspect of the disclosure includes any of the preceding aspects, further including a purge fluid passage within the probe body, wherein the purge fluid passage fluidly couples a purge fluid source to each respective light pipe.

Another aspect of the disclosure includes any of the preceding aspects, further including, for each arrival time sensor, an optical fiber coupled to the detector and substantially aligned with a centerline axis of the light pipe.

Another aspect of the disclosure includes any of the preceding aspects, wherein the rotating component includes a blade of a turbomachine; and wherein the stationary component includes a casing of the turbomachine.

Another aspect of the disclosure includes any of the preceding aspects, further including, for each arrival time sensor, a plurality of prisms coupled to the probe body and physically decoupled from the light pipe, wherein the plurality of prisms is configured to direct radiation from a respective radiation source to the rotating component off-axis with respect to an axis of the respective radiation source.

Further additional aspects of the disclosure include an apparatus for measuring a clearance within a turbomachine, the apparatus including: a probe assembly disposed on a casing of the turbomachine radially outward of a rotating component of the turbomachine, the probe assembly including: a probe body; and a pair of arrival time sensors coupled to the probe body, each arrival time sensor including: a light pipe coupled to the probe body and having a first end and a second end opposite the first end; wherein the first end of the light pipe receives radiation deflected from the rotating component of the turbomachine, and wherein a shape of the light pipe reduces directional variation of the radiation at the second end relative to the first end; a detector positioned to receive the radiation with reduced directional variation from the light pipe; and a controller coupled to the detector, wherein the controller calculates the clearance as a distance between the probe assembly and the rotating component based on an elapsed time between detection of deflected radiation in one of the pair of arrival time sensors and detection of deflected radiation in another of the pair of arrival time sensors.

Another aspect of the disclosure includes any of the preceding aspects, wherein each of the pair of arrival time sensors further includes a focusing lens optically coupled to the second end of the light pipe, the focusing lens shaped to direct the radiation from the light pipe to the detector.

Another aspect of the disclosure includes any of the preceding aspects, wherein the focusing lens includes a plano-convex lens substantially aligned with a centerline axis of the light pipe, and the light pipe includes a homogenizing light pipe shaped to induce total internal reflection on the radiation transmitted therethrough.

Another aspect of the disclosure includes any of the preceding aspects, further including a purge fluid passage within the probe body, wherein the purge fluid passage fluidly couples a purge fluid source to each respective light pipe.

Another aspect of the disclosure includes any of the preceding aspects, wherein the rotating component includes a blade of the turbomachine.

Still further additional aspects of the disclosure include a method for detecting radiation deflected from a rotating component, the method including: transmitting radiation deflected from a surface of the rotating component through a pair of arrival time sensors to a detector, wherein the pair of arrival time sensors is coupled within a probe body mounted to a stationary component radially outward of the rotating component, and wherein each arrival time sensor includes a light pipe coupled to the probe body, the light pipe being configured to reduce directional variation of the radiation at a second end of the light pipe relative to a first end of the light pipe; measuring one of an elapsed time or rotation distance between detection of deflected radiation in one of the pair of arrival time sensors and another of the pair of arrival time sensors; and calculating, via a controller, a clearance distance between the stationary component and the rotating component based on the elapsed time or the rotation distance.

Another aspect of the disclosure includes any of the preceding aspects, further including, for each arrival time sensor, passing the radiation from the light pipe through a focusing lens optically coupled between the light pipe and the detector.

Another aspect of the disclosure includes any of the preceding aspects, further including optically coupling the focusing lens to the detector through an optical fiber.

Another aspect of the disclosure includes any of the preceding aspects, further including passing purge fluid from a passage within the probe body over a surface of the light pipe to remove contaminants therefrom.

Another aspect of the disclosure includes any of the preceding aspects, wherein a shape of the light pipe and a polished reflective coating on internal surfaces of the light pipe induce total internal reflection on the radiation passing through the light pipe during the transmitting.

Another aspect of the disclosure includes any of the preceding aspects, further including mounting the probe body including the pair of arrival time sensors within the stationary component, wherein the stationary component includes a casing of the turbomachine; and wherein the rotating component includes a blade of the turbomachine.

Another aspect of the disclosure includes any of the preceding aspects, further including during the transmitting, directing the radiation from a pair of radiation sources through a plurality of prisms coupled to the probe body, each prism having a distinct angular orientation, wherein the light pipe is physically decoupled from the plurality of prisms.

Another aspect of the disclosure includes any of the preceding aspects, further including optically coupling the focusing lens to the detector through an optical fiber.

BRIEF DESCRIPTION OF THE DRAWINGS

The drawings illustrate embodiments presently contemplated for carrying out the invention. In the drawings.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Embodiments of the disclosure provide an apparatus and method for radiation measurement of components (e.g., rotating components of a gas turbomachine), including methods to transmit and detect such radiation (e.g., for determining clearance between the rotating component and a stationary component, such as a casing, surrounding the rotating component).

An apparatus may include a probe body and a pair of sensor assemblies. Each sensor assembly includes a focusing lens coupled to the probe body and optically coupled to a radiation source. The focusing lens is shaped to output radiation with less directional variation than radiation from the radiation source. A plurality of prisms is coupled to the probe body downstream of each focusing lens, and each prism has a distinct angular orientation to direct radiation from the focusing lens to the component surface off-axis with respect to an axis of the radiation source.

Further embodiments of the disclosure provide a method and apparatus to detect deflected radiation from a component surface (e.g., from the surface of a rotating component of a gas turbomachine). The apparatus includes a pair of time-of-arrival sensors (hereafter "arrival sensors") each including light pipes coupled to a probe body, e.g., the same probe body as an apparatus to transmit radiation or an entirely different probe body. Each light pipe may have a first end positioned to receive radiation deflected from the component surface and a second end opposite the first end. A shape of the light pipe reduces directional variation of the radiation at the second end relative to the first end. A focusing lens may be optically coupled to the second end of the light pipe and shaped to direct radiation from the light pipe to a detector. The radiation, in being deflected from the component surface, may follow a substantially V-shaped pathway from the sensor assembly to the rotating component and back to the arrival time sensor. The horizontal component of each V-shaped pathway may be opposed, e.g., to ensure that a component will intersect with one pathway before intersecting with a subsequent pathway. The detectors each may be optically coupled to the focusing lens of a corresponding arrival time sensor to receive radiation passing through the focusing lens from the light pipe.

Figure 1:
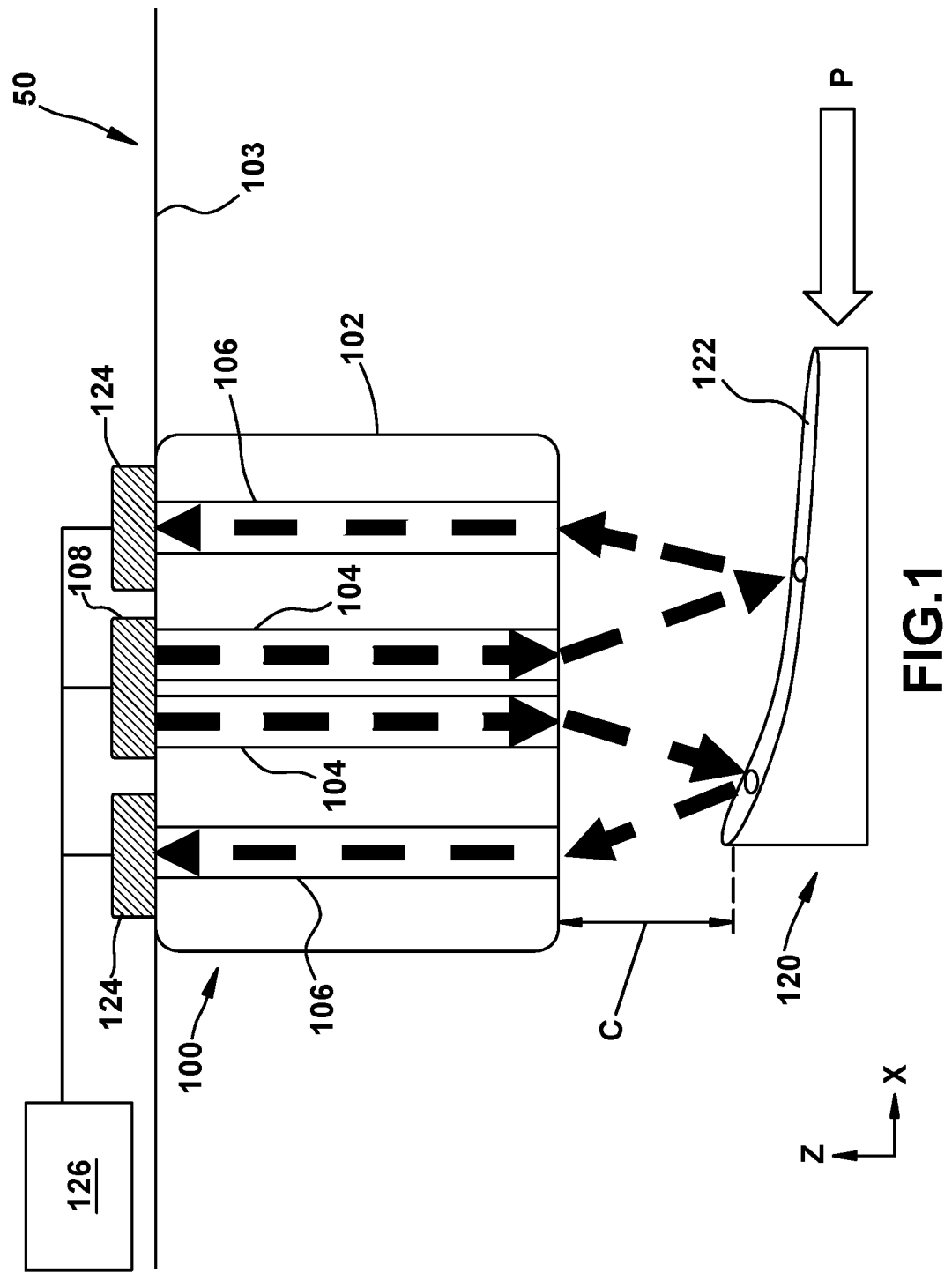
FIG. 1 schematically depicts a side view of a rotating component (e.g., a gas turbine component) whose position is being measured with radiation, according to embodiments of the disclosure.

FIG. 1 depicts a simplified schematic view of an apparatus and method for radiation measurement of a rotating component (e.g., a blade in a gas turbomachine) according to various embodiments. A turbomachine 50 having a simplified version of a probe assembly (simply "probe" hereafter) 100 to measure a rotating component (simply "component" hereafter) 120 is shown in FIG. 1. Component 120 is depicted by example as a rotating blade of turbomachine 50 (e.g., an airfoil portion thereof), but any conceivable type of component may be used. Component 120 may be located in a compressor section of turbomachine 50 or a turbine (i.e., expansion turbine) section of turbomachine 50.

Probe 100 may include a probe body 102 shaped for coupling to an inner wall of a stationary component 103 of turbomachine 50, e.g., the interior wall of a casing where rotatable components (e.g., blades rotatably mounted on a shaft of turbomachine 50) are configured to operate. Probe 100 may include a pair of transmission assemblies 104 for transmitting radiation to component 120 and a corresponding pair of arrival time sensors 106, each for detecting radiation that has been deflected from component 120. In some implementations, each transmission assembly 104 may be included within a different probe 100 or probe body 102 from that of arrival time sensors 106. Various components of probe 100 are discussed in further detail elsewhere herein. Various methods according to the disclosure may include coupling of probe body 102 to stationary component 103, e.g., by mechanical fasteners, adhesives, and/or other mechanical bonding or coupling techniques.

A radiation source 108 may produce radiation (e.g., laser beams and/or other types of radiation-based or optical emissions) that travels through each transmission assembly 104 through probe 100 toward component 120, e.g., a rotating blade of a turbomachine. A surface 122 of component 120 can deflect the radiation from each transmission assembly 104 back to probe 100 at a corresponding location. The corresponding arrival time sensors 106 may receive and direct the deflected radiation toward a detector 124 optically coupled to arrival time sensor(s) 106. Component 120 may move along a scan path (e.g., path P shown in FIG. 1, which coincides with a circumferential direction around an axis of the turbomachine), such that surface 122 moves relative to probe 100. Component 120, such as a rotating blade of a turbomachine, may cross multiple paths of radiation from transmission assembly(s) 104 (e.g., by rotation) sequentially, causing surface 122 to deflect the radiation in each path back to corresponding arrival time sensors 106 and detectors 124 of probes 100.

Figure 2:
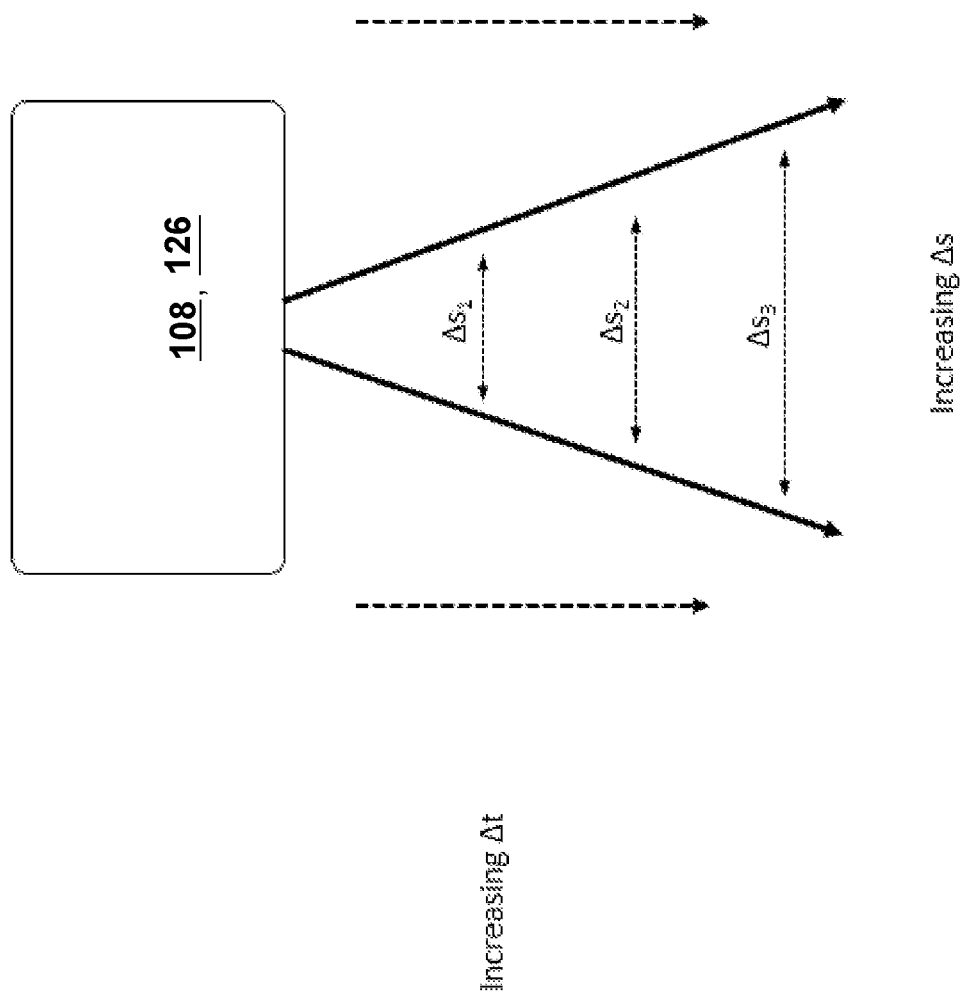
FIG. 2 schematically depicts, in cross-section, differences between elapsed time and rotation distance at different amounts of clearance in methods according to embodiments of the disclosure.

Referring to FIGS. 1 and 2, a controller 126 may be coupled to each pair of detectors 124 and radiation sources 108 to calculate an elapsed time ($\Delta t$), or rotation distance ($\Delta s$), between each deflection of radiation by component 120. Controller 126 may include a processor and memory for implementing various operational methodologies and, in various implementations, may include a general purpose computing device, special purpose computing device, and/or any other currently known or later developed control device. Controller 126 may be coupled to or may be exterior to turbomachine 50 in which stationary component 103 (casing) and component 120 (rotating blade) are located. As shown by example in FIG. 2, when the clearance (radial distance) between component 120 and stationary component 103 increases (thereby increasing the distance between radiation sources 108 and component(s) 120 under analysis), the amount of elapsed time between detection of radiation by a sequential pair of arrival time sensors increases, and the amount of rotation (circumferential) distance by which component 120 travels during the elapsed time increases.

Controller 126 may evaluate an elapsed time $\Delta t$ or rotation distance $\Delta s$ between the detecting of radiation for each corresponding pair of detectors 124. Controller 126 may use this evaluated time difference or rotation distance, and/or other reference data (such as calibrated settings for component(s) 120) to calculate a clearance C. Clearance C may be expressed as a distance, such as a total number of centimeters between surface(s) 122 of component 120 (e.g., a rotating blade) and an inwardly facing surface of stationary component 103. Embodiments of the disclosure may include various features of probe 100 to increase the amount of radiation that successfully reaches surface 122 of component 120 and that successfully reaches detectors 124 after deflection from surface 122, as compared to conventional measurement systems and/or methodologies.

Figure 3:
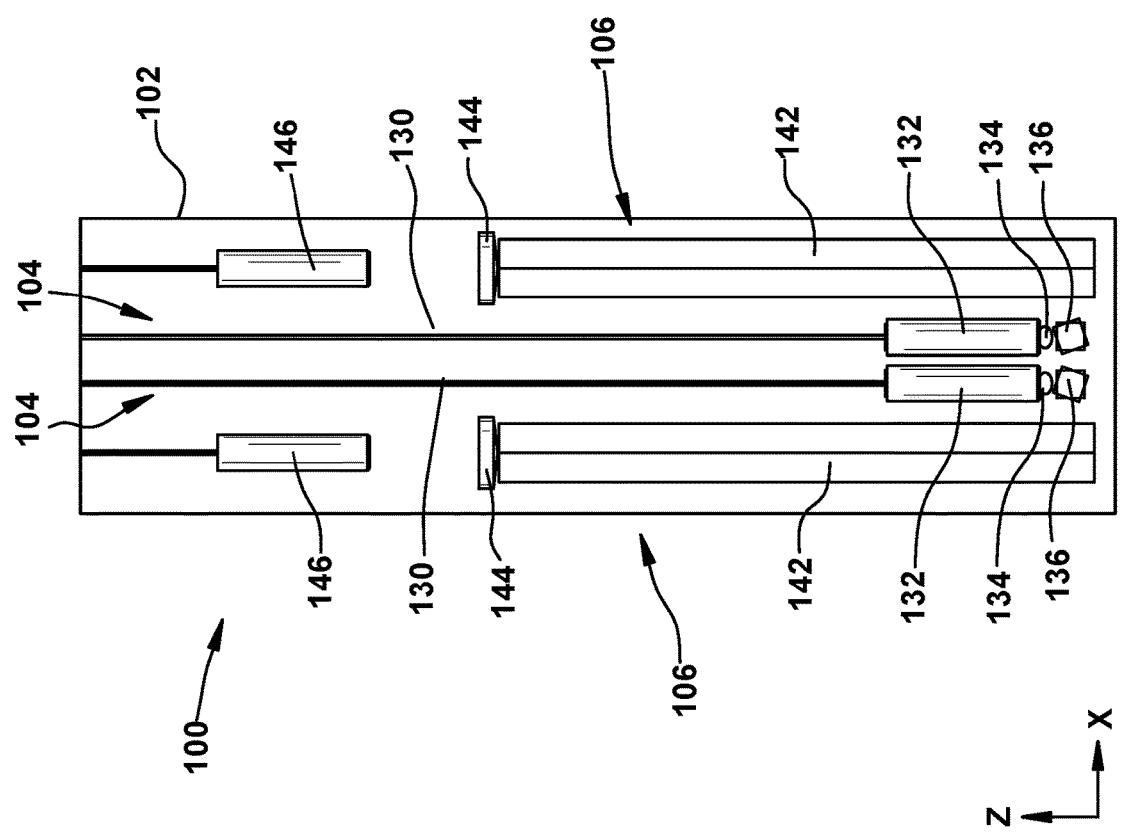
FIG. 3 schematically depicts, in cross-section, a system and apparatus for radiation measurement of a component, according to embodiments of the disclosure.

Turning to FIG. 3, a cross-sectional view of probe 100 is shown to further illustrate various components within each transmission assembly 104 and arrival time sensor 106. Referring initially to transmission assemblies 104, each assembly 104 may include an optical medium 130 (e.g., any light transmitting mechanism such as an optical fiber, cable, and/or radiation-transmissive materials) for transmitting radiation to an output end 132, e.g., a fiber ferule or other component for securing one end of optical medium 130 in a predetermined position. In some embodiments, output end 132 may place optical medium 130 in optical communication with a focusing lens 134 coupled to probe body 102.

Figure 4:
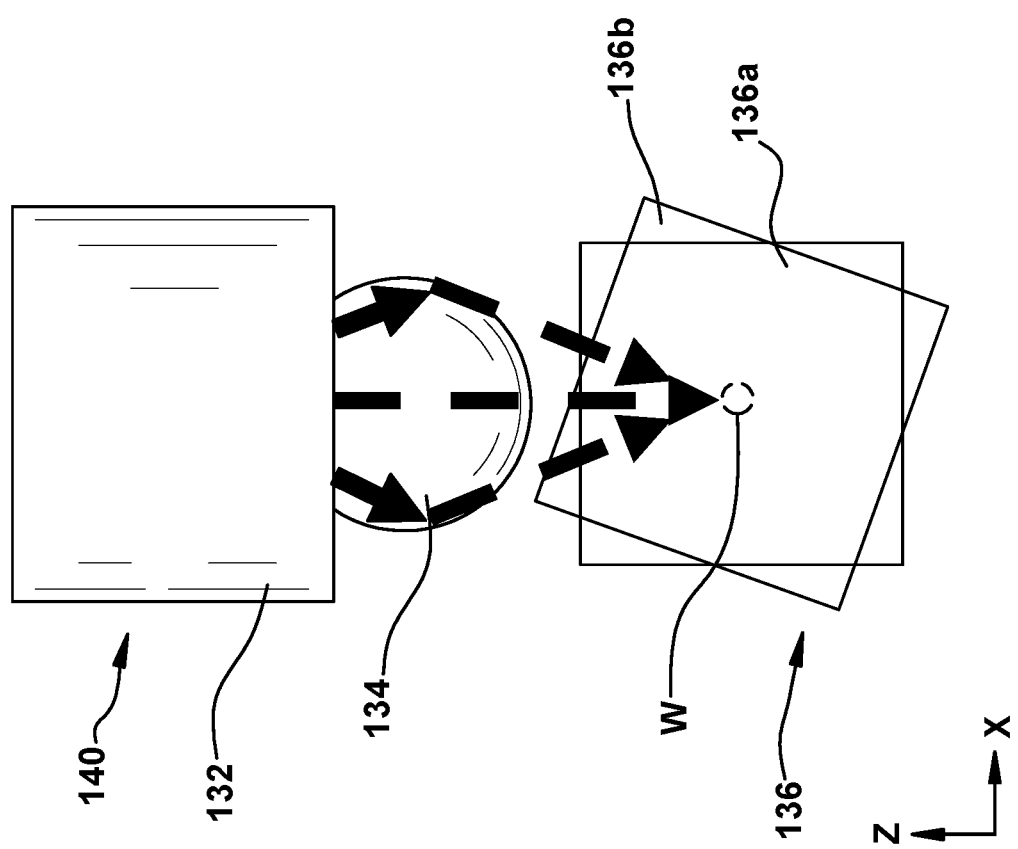
FIG. 4 schematically depicts a front view of a focusing lens and plurality of prisms for transmitting radiation, according to embodiments of the disclosure.

Referring to FIGS. 3 and 4, focusing lens 134 may take the form of any lens shaped to direct incoming radiation at multiple output angles toward a single focal point that is located outside of focusing lens 134. According to one example, focusing lens 134 may include a rounded lens (e.g., as depicted in FIG. 4) having a pair of rounded opposing surfaces shaped to first separate incoming radiation into multiple directions of travel before redirecting the separated radiation in converging directions toward a point outside focusing lens 134. Focusing lens 134 may have a variety of shapes, e.g., an oblong body positioned between two opposing rounded edges, a spherical shape, and/or any other applicable geometry. Example radiation pathways created in focusing lens 134 are shown in FIG. 4 using dashed lines. In further implementations, focusing lens 134 may include other types of lenses and/or light transmitting structures shaped to focus light on a focal point W (FIG. 4) located outside of focusing lens 134. Focal point W located outside of focusing lens 134 may be positioned on and/or near a plurality of prisms 136 for deflecting light in a predetermined direction and/or orientation as discussed herein. Focusing lens 134 and/or plurality of prisms 136 may be mounted within probe body 102, e.g., using coupling components and/or other mounting materials such as fasteners, potting materials, adhesives, and/or any other currently known or later developed mechanical coupling materials or mechanisms.

It should be understood that, while FIGS. 3 through 9 illustrate embodiments that include focusing lens 134, other embodiments (not shown) may omit focusing lens 134, in which case optical medium 130 is transmitted directly through plurality of prisms 134 with plurality of prisms 134 directing radiation from a respective radiation source of the pair of radiation sources to the surface of the rotating component off-axis with respect to an axis of the respective radiation source and with less directional variation than the radiation from the respective radiation source.

Figure 5:
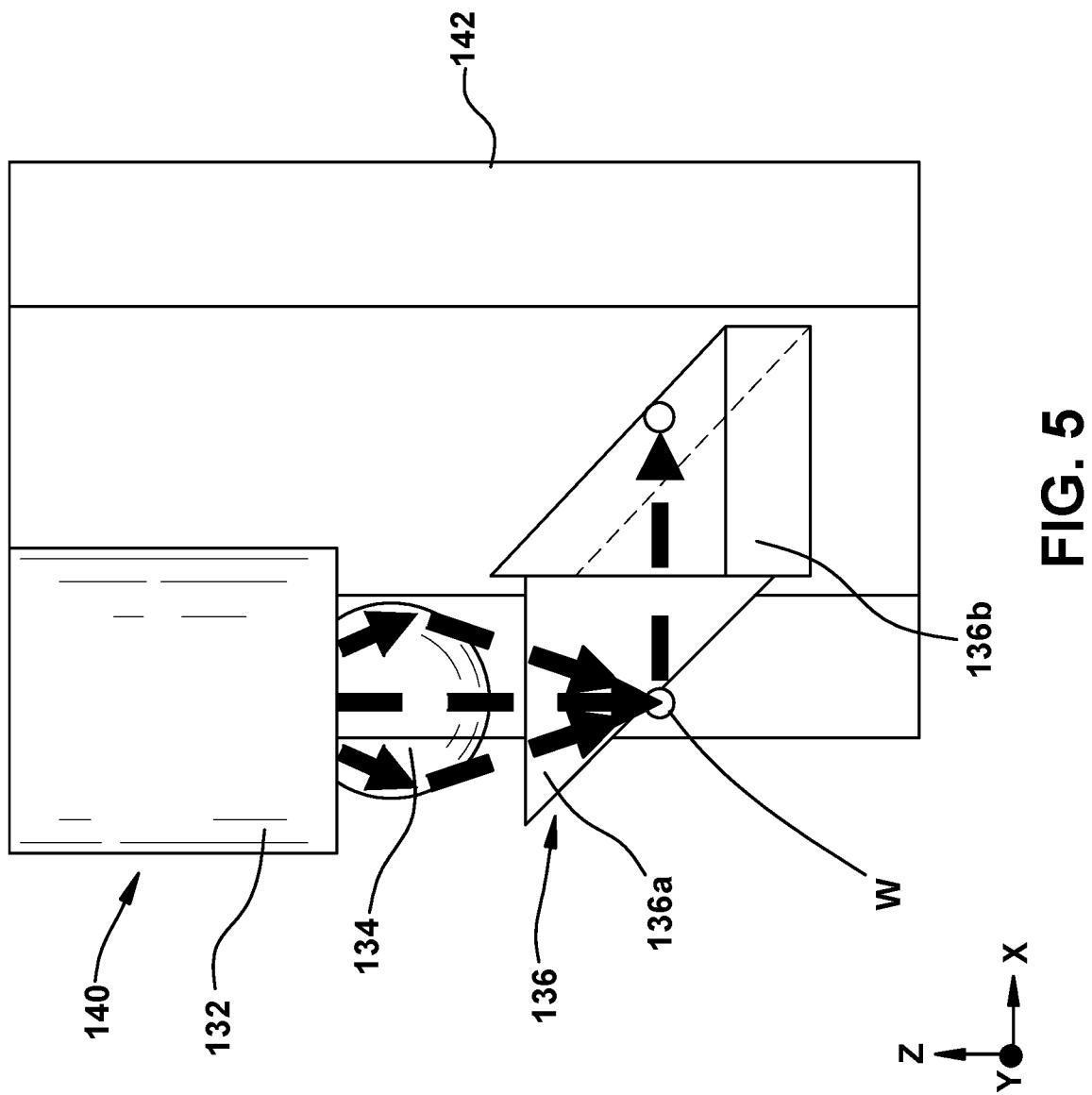
FIG. 5 schematically depicts a side view of a focusing lens and plurality of prisms for transmitting radiation, according to embodiments of the disclosure.
Figure 6:
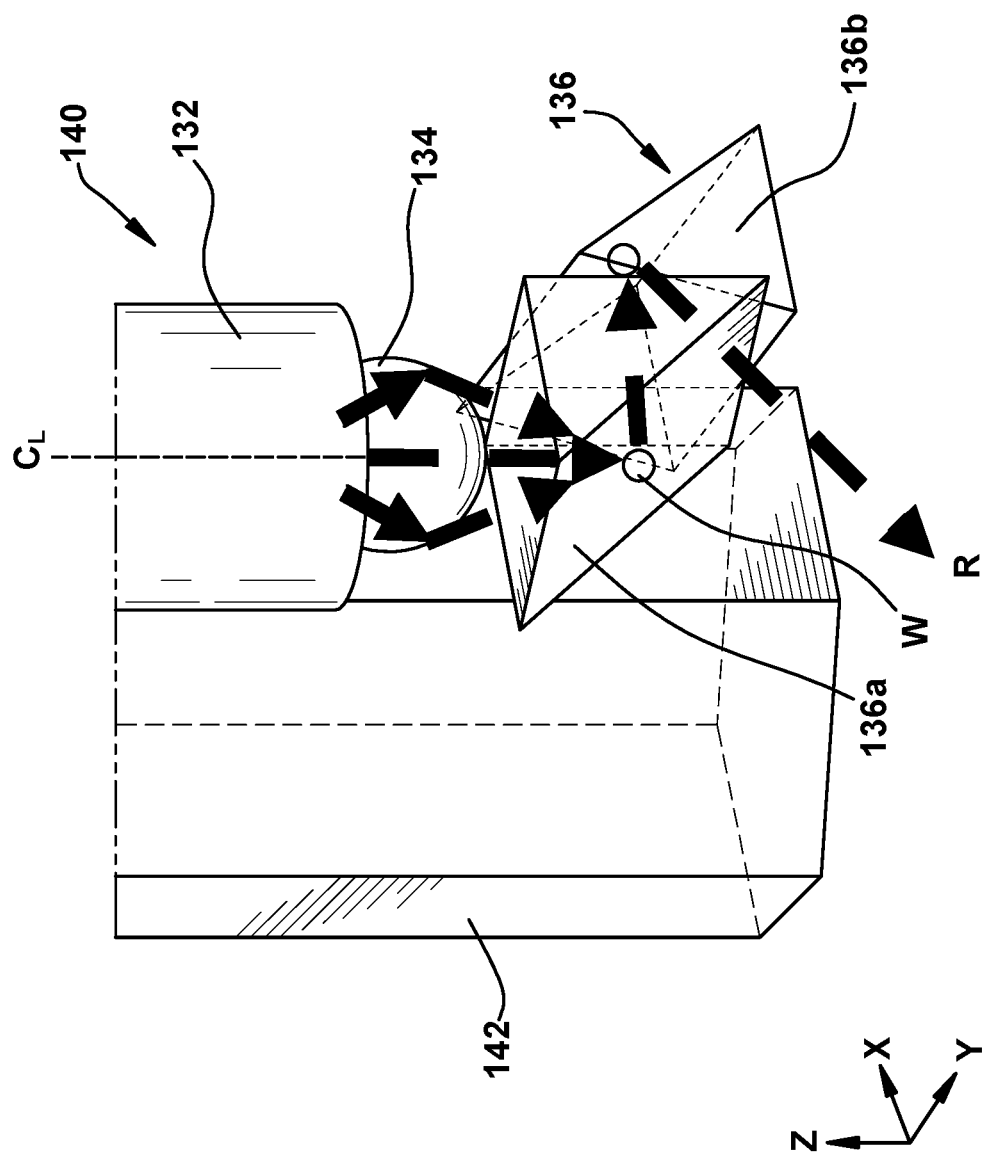
FIG. 6 schematically depicts a perspective view of a focusing lens and plurality of prisms for transmitting radiation, according to embodiments of the disclosure.

Turning to FIGS. 4-6 together, embodiments of the disclosure provide an apparatus 140 for transmitting radiation to component 120 (FIG. 1), e.g., a rotating blade of a turbomachine, according to embodiments of the disclosure. Probe body 102 is omitted from FIGS. 4-6 for clarity of illustration, but it is understood that output end 132, focusing lens 134, and/or plurality of prisms 136 may be coupled to probe body 102, e.g., by being mounted therein as discussed elsewhere herein. Plurality of prisms 136 may include, e.g., two or more prisms, for altering the pathway of radiation from focusing lens 134 to travel in a predetermined direction. According to an example, plurality of prisms 136 may include a first prism 136a and a second prism 136b each shaped to reflect radiation in a predetermined direction. Embodiments of the disclosure may include selecting a distinct angular orientation for each prism (e.g., first prism 136a and second prism 136b) of plurality of prisms 136, and mounting plurality of prisms 136 within probe body 102 such that they have their desired orientation. In this case, the mounting of prisms 136 may include coupling prisms 136 to various coupling components and/or filling an interior chamber for plurality of prisms 136 with a potting material. Plurality of prisms 136 may include reflective materials such as silica, calcium fluoride ($CaF_2$), zinc selenide (ZnSe), and/or other materials, which are configured for reflecting radiation.

In the FIG. 5 example, first prism 136a may be a right angle (e.g., triangularly shaped) prism having a reflecting surface coincident with focal point W, and within the Y-Z plane. Second prism 136b, however, may have an orientation that is out of the Y-Z plane (e.g., rotated by approximately twenty degrees relative to the Y axis as discussed herein). In this configuration, first prism 136a may be a "transverse" right angle prism, whereas second prism 136b may be considered to be a "pitched" right angle prism (i.e., a prism that is rotated by a predetermined amount relative to another to induce a desired change in orientation). To further manipulate the direction of radiation exiting focusing lens 134, any desired number of prisms with various directional orientations may be used. A benefit to using plurality of prisms 136, as compared with other radiation-manipulating structures, is that the radiation density produced from focusing lens 134 remains substantially unaffected as radiation travels through plurality of prisms 136.

Figure 7:
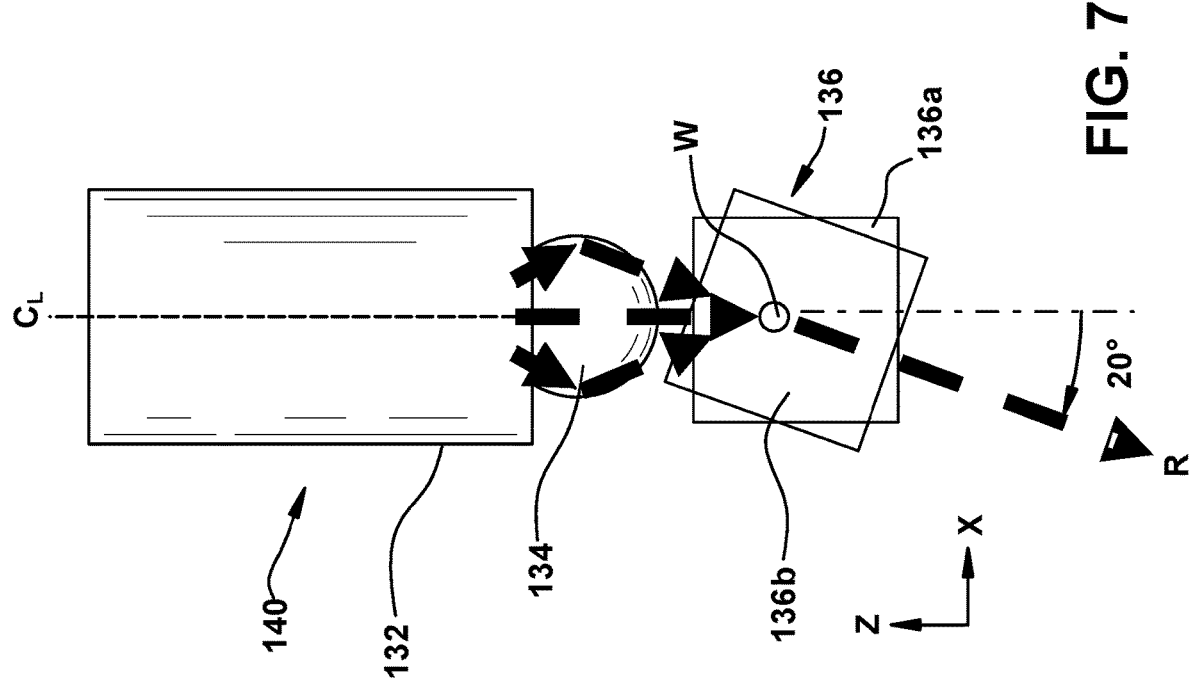
FIG. 7 schematically depicts an annotated front view of a focusing lens and plurality of prisms for transmitting radiation along a predetermined axis, according to embodiments of the disclosure.

As shown specifically in FIG. 7, radiation may exit plurality of prisms 136 in each assembly 104 by traveling along a pathway R that is oriented off-axis with respect to a centerline axis $C_L$ of output end 132 and focusing lens 134. Pathway R may be oriented off-axis, e.g., to produce a directional component that is oriented toward the location of radiation detecting components located elsewhere within probe body 102 and/or stationary component 103 (FIG. 1). According to an example, pathway R is oriented along an axis that is approximately twenty degrees different from centerline axis $C_L$. It is understood that the angular difference between pathway R and centerline axis $C_L$ can vary based on the number of prisms in plurality of prisms 136 and/or their orientation(s), to suit several component types and/or applications.

Figure 8:
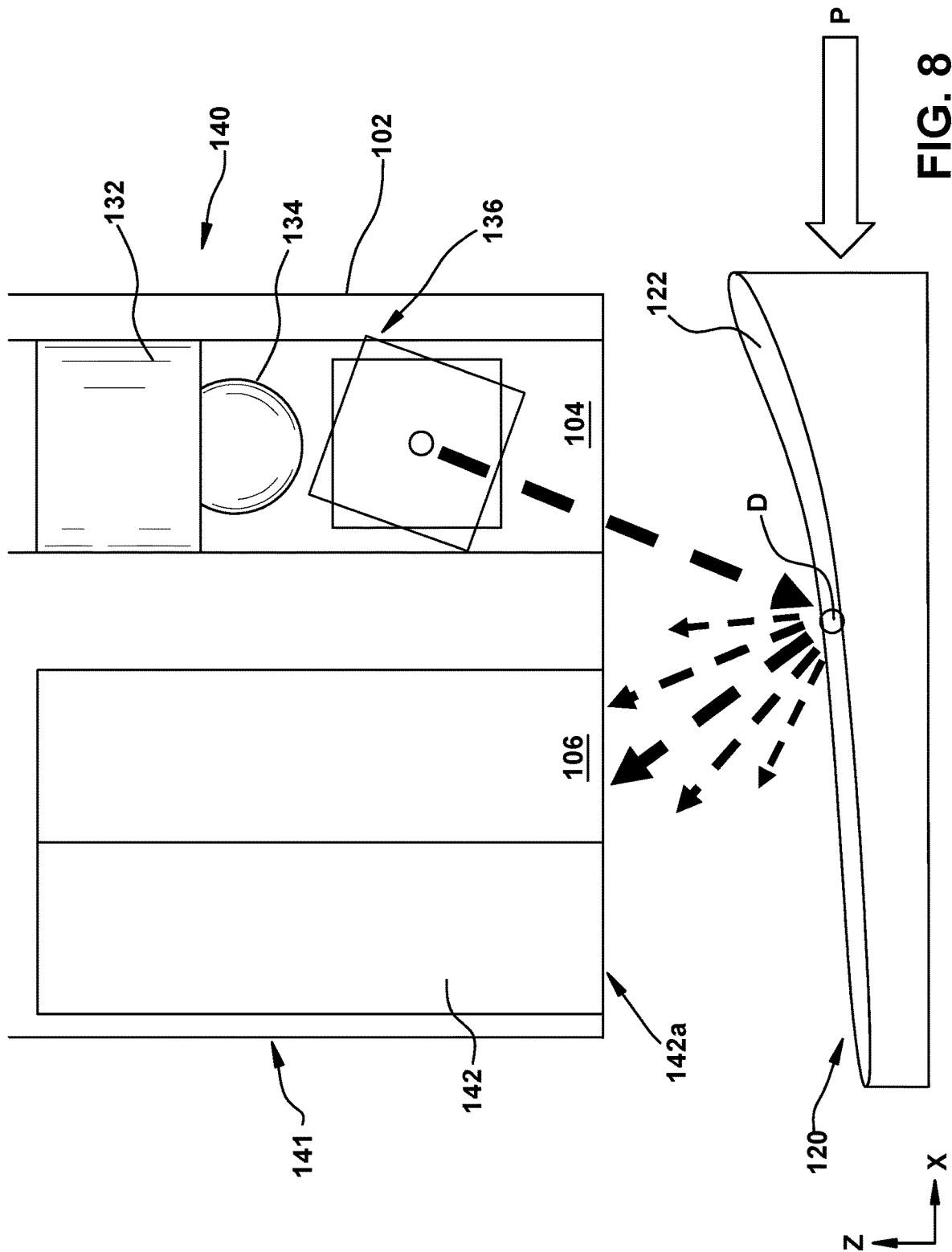
FIG. 8 schematically depicts an annotated front view of an apparatus for transmitting and deflecting radiation from a rotating gas turbine component, according to embodiments of the disclosure.

FIG. 8 depicts a method of transmitting radiation to surface 122 of component 120, e.g., using embodiments of apparatus 140. Radiation sources 108 (FIG. 1) may transmit radiation to focusing lens 134 of each assembly 104, where it may be output with less directional variation than present at the output of the radiation source. Plurality of prisms 136 may direct radiation from transmission assembly 104 to a location D (e.g., a point on an outermost surface of a rotatable blade) on component 120 to be deflected toward arrival time sensor 106, e.g., elsewhere within probe body 102. Radiation transmitted from each radiation source 108 of apparatus 140 may be deflected at two or more locations back toward a corresponding probe body 102 or portion thereof, e.g., from surface 122.

Unlike plurality of prisms 136, the composition of surface 122 of component 120 may cause radiation to be deflected in several directions as indicated by multiple dashed lines in FIG. 8. The deflected radiation nevertheless may be oriented toward the location of a corresponding arrival time sensor 106, e.g., due to the prior focusing of radiation in focusing lens 134 and the re-orienting of focused radiation through plurality of prisms 136. Further embodiments of the disclosure provide an apparatus 141 and method for detecting radiation deflected from component 120 even when it is deflected in a variety of orientations, e.g., as shown by example in FIG. 8. As shown, apparatus 141 may be physically decoupled from apparatus 140 even when apparatus 141 and apparatus 140 are included within or coupled to one probe body 102.

Figure 9:
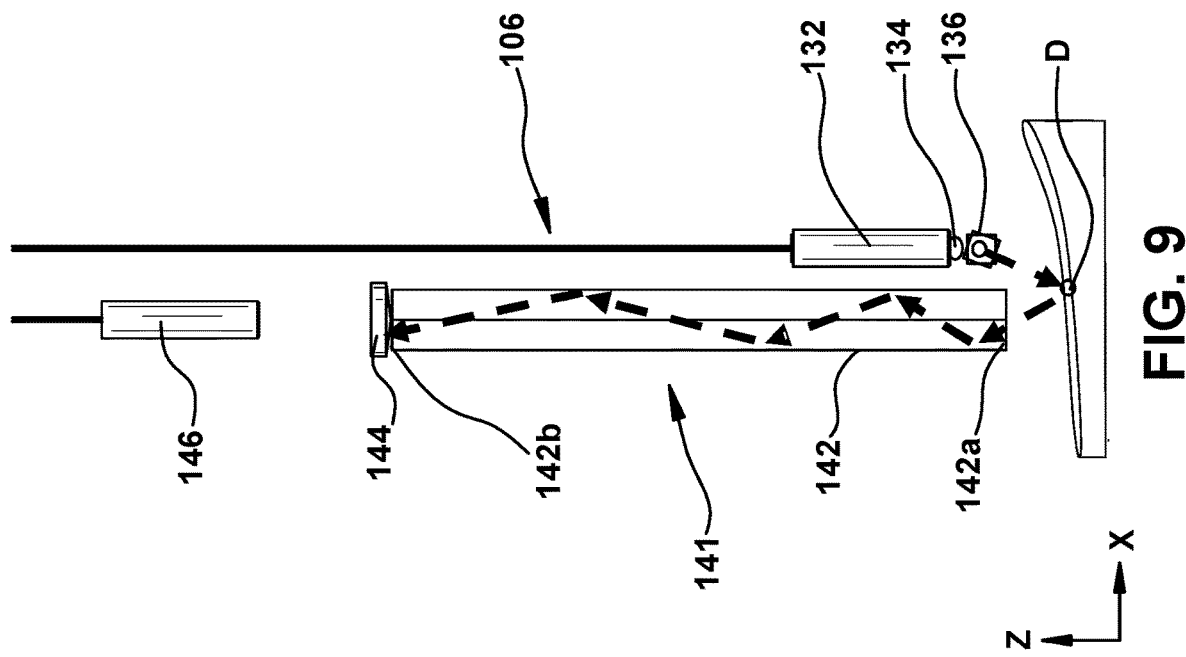
FIG. 9 schematically depicts a front view of an apparatus for detecting deflected radiation from a rotating gas turbine component, according to embodiments of the disclosure.
Figure 11:
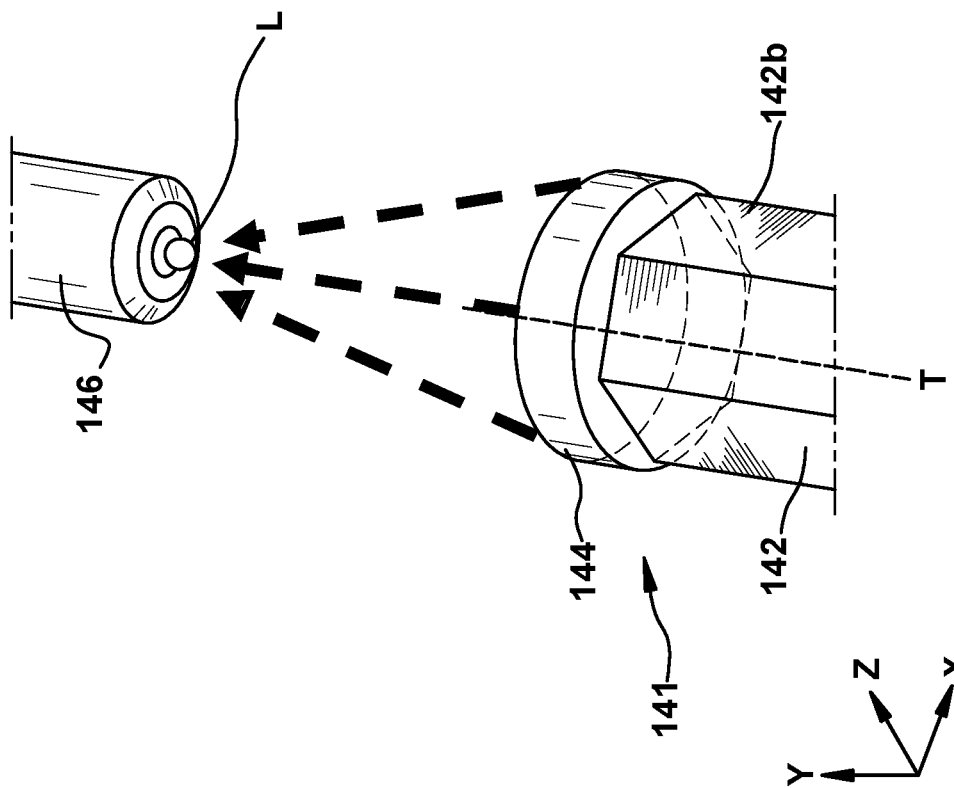
FIG. 11 schematically depicts a perspective front view of an apparatus for detecting deflected radiation from a component, according to embodiments of the disclosure.

Referring to FIGS. 8 and 9 together, embodiments of apparatus 141 may include, e.g., arrival time sensor 106 having two or more light pipes 142 within probe 100. Each light pipe 142 may include a first end 142a that is positioned to receive radiation deflected from surface 122 of component 120, such as a rotatable blade of a turbomachine. Unlike focusing lens 134, plurality of prisms 136, or other radiation-transmitting components discussed herein, each light pipe 142 may homogenize and direct radiation from one location to another. Light pipes 142 thus may have a predetermined shape (e.g., hexagonal as shown in FIGS. 6, 11) with multiple surfaces shaped to induce total internal reflection (TIR) on radiation passing therethrough. TIR refers to a physical phenomenon in which radiation waves, upon reaching the boundary from a first material (e.g., air or other radiation transmitting materials within light pipe 142) to another (e.g., internal surfaces of light pipe 142) are not refracted into the second medium, but instead completely reflected into the first material. To produce this effect, internal surfaces of light pipe 142 may be coated with a polished reflective material (e.g., metal-based and/or organic-based reflective materials) that reflects light and withstands corrosion in environments such as the space within stationary component 103. Light pipe 142, during operation, will cause radiation therein to have a reduced directional variation at a second end 142*b* (FIG. 9) that is opposite first end 142*a*.

Light pipe may have a predetermined cross-sectional area that is larger than other components discussed herein (including, e.g., optical medium 132, focusing lens 134, plurality of prisms 136, etc.), and may have a cross-sectional area of at least approximately 0.075 square millimeters (mm$^2$). The size of light pipe 142 may allow light pipe 142 to collect radiation oriented in multiple orientations, thereby steering such radiation from first end 142*a* of light pipe 142 to second end 142*b*.

Figure 10:
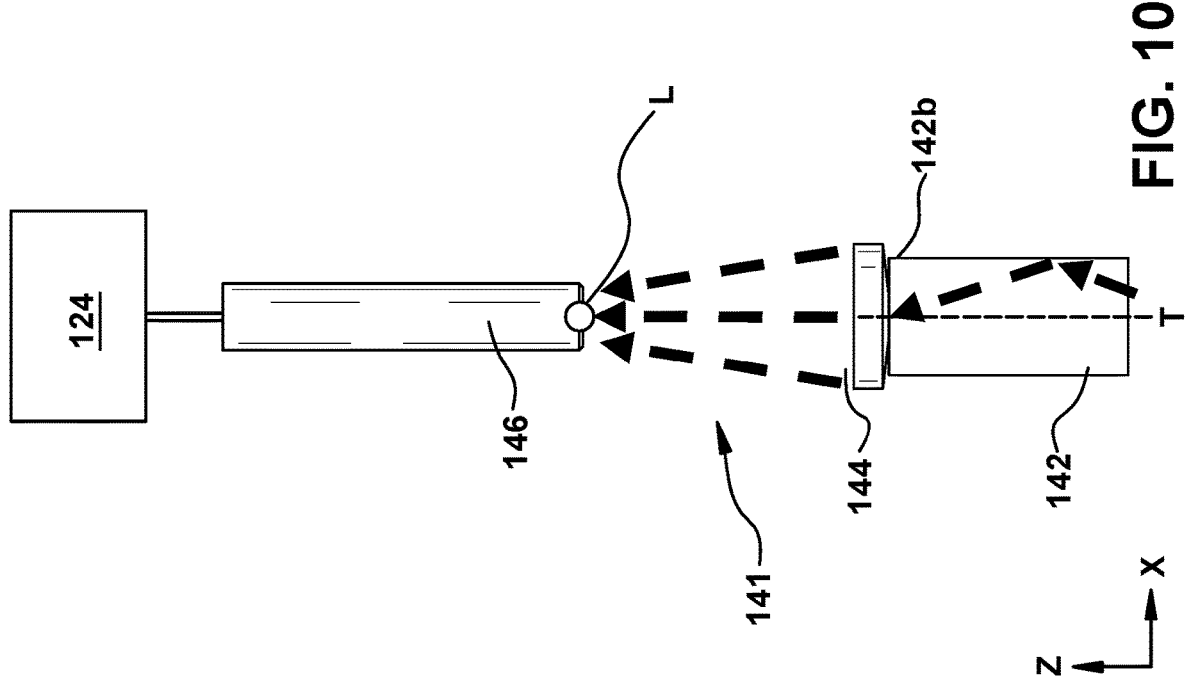
FIG. 10 schematically depicts an expanded front view of an apparatus for detecting deflected radiation from a component, according to embodiments of the disclosure.

Referring to FIGS. 10 and 11, each arrival time sensor 106 of apparatus 141 also may optionally include a focusing lens 144 coupled to second end 142*b* of light pipe 142. Focusing lens may be a plano-convex lens substantially aligned with a centerline axis T of light pipe 142, such that focusing lens 144 focuses radiation from light pipe 142 toward a point L on an optical medium 146. However embodied, focusing lens 144 is shaped to direct radiation to detector 124, e.g., through optical medium 146 such as an optical fiber and/or any other currently known or later developed device for transmitting radiation. Detector 124 may be optically coupled to focusing lens 144 through optical medium 146. Focusing lens 144 focuses and directs radiation into optical medium 146 such that it may pass to detector 124. As discussed elsewhere herein, controller 126 (FIG. 1) may be coupled to detector 124 and may calculate clearance C (FIG. 1) based on an elapsed time or rotation distance between when each arrival time sensor 106 detects radiation that has been deflected from surface 122 of component 120.

It should be understood that, while FIGS. 9 through 11 illustrate embodiments that include focusing lens 144, other embodiments (not shown) may omit focusing lens 144, in which case the radiation is output through light pipe 142 directly to optical medium 146 and/or detector 124.

Apparatus 141, as discussed herein, may be used to implement methods for detecting radiation deflected from surface 122 of component 120. Methods according to the disclosure may include transmitting radiation through multiple assemblies 104 to component 120, where the radiation can be deflected from component surface 122. Each arrival time sensor 106 includes light pipe 142 in probe body 102 to collect and reduce directional variation of radiation, such that radiation exiting light pipe 142 through its second end 142*b* has less directional variation than radiation entering first end 142*a* of light pipe 142. Methods according to the disclosure also may include inducing total internal reflection (TIR) on radiation as it passes through light pipes 142, e.g., through a material composition of surfaces therein. The radiation then may be directed from light pipes 142 through a corresponding focusing lens 144 optically coupled to light pipe 142. Focusing lens 144 may direct radiation from light pipe 142 to detector 124, e.g., directly and/or through optical medium 146.

Figure 12:
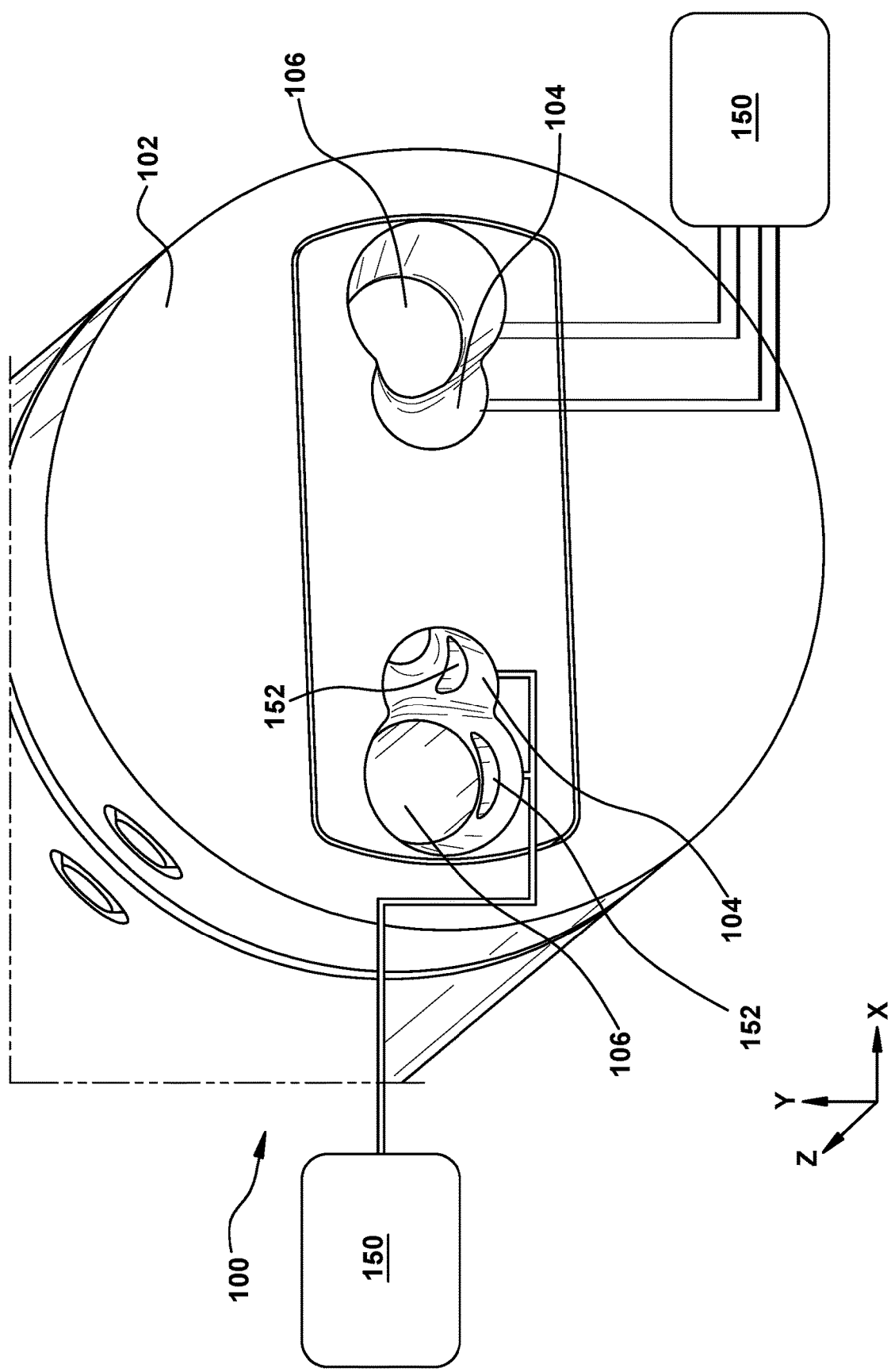
FIG. 12 depicts a perspective exterior view of a probe body tip, according to embodiments of the disclosure.
Figure 13:
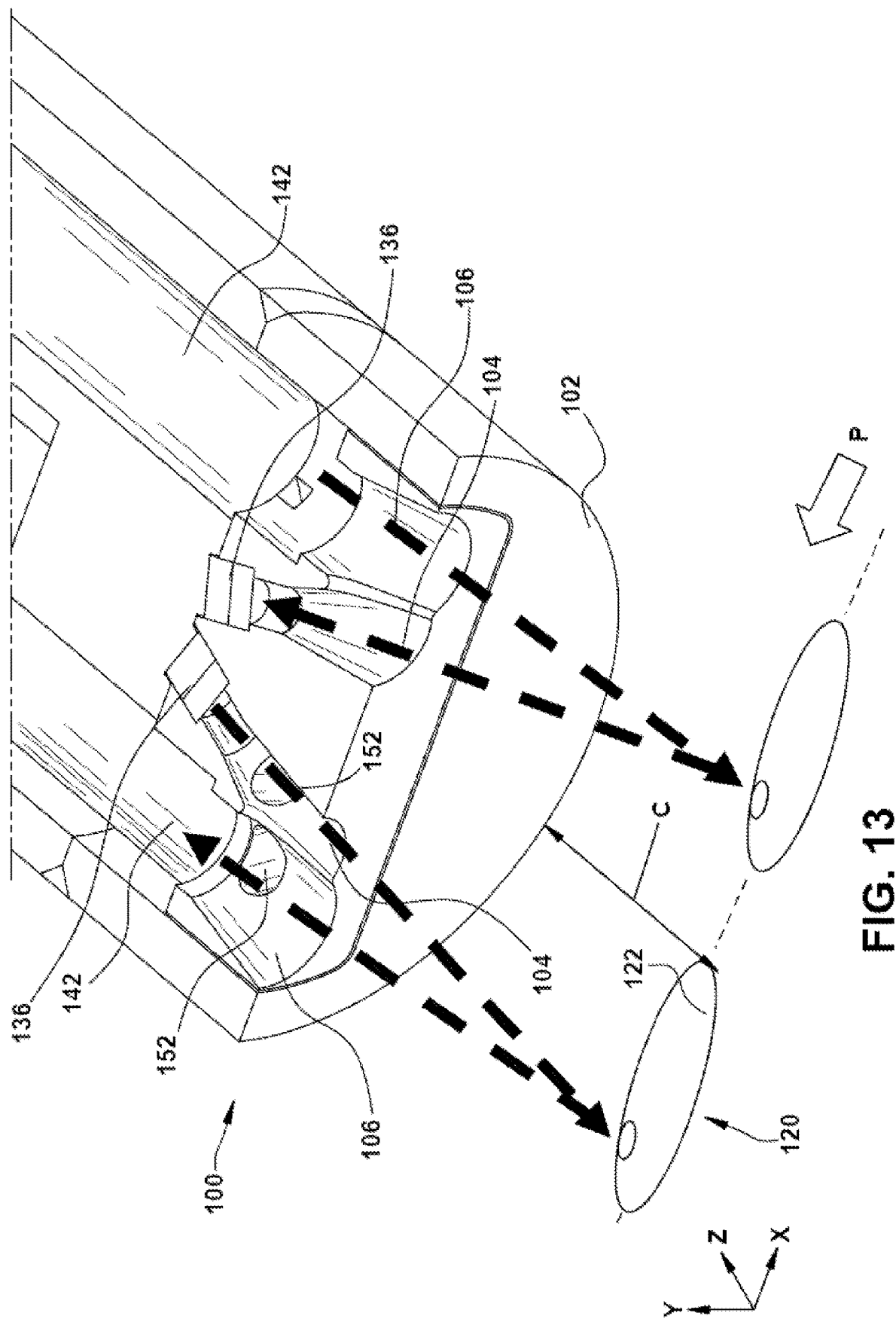
FIG. 13 depicts a cut-away perspective view of a probe body tip, according to embodiments of the disclosure.

Turning now to FIGS. 12 and 13, embodiments of probe 100 and probe body 102 may include further structural features to prevent the components therein from being contaminated or corroded during operation. A purge fluid supply 150 may be fluidly coupled to a set of purge fluid passages 152 for transmitting purge fluid to components within each assembly 104 and/or arrival time sensor 106 of probe body 102. The term "purge fluid," in this context, may refer to any supply of fluid (e.g., gas(es) such as air) that may be transmitted to probe body 102 by any currently known or later developed transmission mechanism such as positive pressure. Upon being delivered to transmission assembly 104 or arrival time sensor 106 of probe body 102, the purge fluid may remove contaminants, corrosion, and/or other undesired materials from probe body 102. Purge fluid supply 150 in some cases may be external to probe body 102, e.g., it may be coupled to purge fluid passages 152 through fluid circuits within stationary component 103 and/or located elsewhere in turbomachine 50 (FIG. 1). Further functions of purge fluid delivered to transmission assemblies 104 or arrival time sensors 106 of probe body 102 may include, e.g., cooling of probe body 102 components in cases where purge fluid(s) within purge fluid supply 150 are at a lower temperature than probe body 102. In further implementations, some transmission assemblies 104 and arrival time sensors 106 of probe body 102 may include purge fluid passages 152, whereas other transmission assemblies 104 and other arrival time sensors of probe body 102 may be free of such passages therein. It is further understood that one purge fluid passage 152 or set of fluid passages may be fluidly coupled to multiple transmission assemblies 104 and multiple arrival time sensors 106.

Embodiments of the disclosure may provide various technical and commercial advantages, examples of which are discussed herein. Embodiments of the disclosure may use a combination of prism shapes and arrangements to emit radiation to a component for measurement along directions that are off-axis from (i.e., not oriented in parallel with) a centerline axis of the probe body for sending and receiving radiation for measurement. In addition, the inclusion of a light pipe within the arrival time sensors of the probe may collect deflected radiation and homogenize the collected radiation before it is focused into an optical medium for detection. Unlike conventional structures, which simply may include a lens as the first component of an arrival time sensor, the light pipe in each arrival time sensor will collect and homogenize radiation deflected at a variety of angles before a downstream focusing lens directs the homogenized light into a detector. This arrangement ensures that deflected radiation at each location will be focused along a centerline axis of any downstream optical media, despite various components in the sent path being structured to transmit radiation off-axis with respect to the centerline axis of the probe.

The various components discussed herein, moreover, are capable of being manufactured at a scale significantly smaller than conventional capacitive probes and may be coupled to or housed within a probe having a diameter of at most approximately eleven millimeters. Embodiments of the disclosure, when implemented in such a probe, may operate at temperatures of approximately 340 degrees Celsius (° C.) and with a measurement resolution of approximately mm. These and other parameters may cause methods and apparatuses of the present disclosure to be particularly well suited to measuring the clearance between a turbomachine casing and the rotatable blade(s) of a turbomachine.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", is not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise. "Approximately" as applied to a particular endpoint of a range applies to both endpoints and, unless otherwise dependent on the precision of the instrument measuring the value, may indicate +/−10% of the stated endpoint value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described to best explain the principles of the disclosure and the practical application, and to enable others of ordinary skill in the art to understand the disclosure for various embodiments with various modifications as are suited to the particular use contemplated.

What is claimed is:

1. A probe assembly for transmitting radiation from a pair of radiation sources to a rotating component surface, the probe assembly comprising:
    a probe body on a stationary component;
    a pair of sensor assemblies coupled to the probe body, each sensor assembly including:
        a plurality of prisms coupled to the probe body, each prism of the plurality of prisms having a distinct angular orientation to direct radiation from a respective radiation source to the rotating component surface off-axis with respect to an axis of the respective radiation source of the pair of radiation sources and with less directional variation than radiation from the respective radiation source.

2. The probe assembly of claim 1, wherein each sensor assembly further includes a focusing lens coupled to the probe body and optically coupled between a respective radiation source of the pair of radiation sources and the plurality of prisms.

3. The probe assembly of claim 2, wherein the focusing lens, in each of the pair of sensor assemblies, includes a set of axially opposed rounded edges.

4. The probe assembly of claim 2, wherein each of the pair of radiation sources includes an optical fiber and wherein the focusing lens, of the respective sensor assembly, is coupled to an output end of the respective optical fiber.

5. The probe assembly of claim 1, further comprising a purge fluid passage within the probe body, wherein the purge fluid passage fluidly couples a purge fluid source to the plurality of prisms in each of the pair of sensor assemblies.

6. The probe assembly of claim 1, wherein the plurality of prisms, in each of the pair of sensor assemblies, is configured to direct the radiation from the respective radiation source along a pathway that is approximately twenty degrees from a centerline axis of the probe body.

7. The probe assembly of claim 1, wherein each of the plurality of prisms, in each of the pair of sensor assemblies, is a right-angle prism.

8. The probe assembly of claim 1, wherein the rotating component surface is a surface of a rotating blade of a turbomachine; and the probe body is coupled to a casing of the turbomachine positioned radially outward from the rotating blade.

9. The probe assembly of claim 1, further comprising at least two light pipes, each light pipe coupled to the probe body and physically decoupled from each plurality of prisms, wherein each light pipe is positioned to detect the radiation after the radiation is deflected from the rotating component surface.

10. An apparatus for measuring a clearance within a turbomachine, the apparatus comprising:
    a probe assembly on a casing of a turbomachine, the probe assembly including:
        a probe body mounted to the casing;
        a pair of sensor assemblies coupled to the probe body, each sensor assembly including:
            a plurality of prisms coupled to the probe body, each prism of the plurality of prisms having a distinct angular orientation to direct radiation from a respective radiation source to a rotating component surface off-axis with respect to an axis of the respective radiation source and with less directional variation than radiation from the respective radiation source;
    a detector for receiving radiation deflected from the rotating component surface; and
    a controller coupled to the detector, wherein the controller calculates the clearance as a distance between the probe assembly and the rotating component surface based on an elapsed time between detection of deflected radiation from a first radiation source and detection of deflected radiation from a second radiation source.

11. The apparatus of claim 10, wherein each sensor assembly further includes a focusing lens coupled to the probe body and optically coupled between a respective radiation source of the pair of radiation sources and a respective plurality of prisms.

12. The apparatus of claim 11, wherein the focusing lens, in each of the pair of sensor assemblies, includes a set of axially opposed rounded edges, each of the pair of radiation sources includes an optical fiber, and the focusing lens, of the respective sensor assembly, is coupled to an output end of the respective optical fiber.

13. The apparatus of claim 10, further comprising a purge fluid passage within the probe body, wherein the purge fluid passage fluidly couples a purge fluid source to the plurality of prisms in each of the pair of sensor assemblies.

14. The apparatus of claim 10, wherein the rotating component surface is a surface of a rotating blade of the turbomachine.

15. A method for transmitting radiation to a surface of a rotating component, the method comprising:
- transmitting radiation from a pair of radiation sources through at least two sensor assemblies disposed in a probe body on a stationary component radially spaced from the rotating component, wherein each sensor assembly includes:
  - a plurality of prisms coupled to the probe body, each prism having a distinct angular orientation such that the plurality of prisms directs radiation from the respective radiation source to the surface of the rotating component off-axis with respect to an axis of the respective radiation source and with less directional variation than radiation from a respective radiation source of the pair of radiation sources;
- measuring one of an elapsed time or rotation distance between detection of deflected radiation from a first radiation source from the surface of the rotating component and detection of deflected radiation from a second radiation source from the surface of the rotating component; and
- calculating, via a controller, a clearance distance between the stationary component and the rotating component based on the elapsed time or the rotation distance.

16. The method of claim 15, further comprising passing purge fluid from a passage within the probe body over the plurality of prisms, in each of the pair of sensor assemblies, to remove contaminants therefrom.

17. The method of claim 15, wherein each sensor assembly of the at least two sensor assemblies further includes a focusing lens coupled to the probe body radially outward of the plurality of prisms; and wherein transmitting radiation from the pair of radiation sources through the at least two sensor assemblies further comprises directing the radiation through the respective focusing lens of each respective sensor assembly prior to directing the radiation through the plurality of prisms; and wherein directing the radiation through the plurality of prisms causes the radiation to be oriented along a pathway that is approximately twenty degrees from a centerline axis of the probe body.

18. The method of claim 15, wherein the rotating component includes a blade of a turbomachine; and wherein the stationary component includes a casing of the turbomachine.

19. The method of claim 15, further comprising collecting radiation deflected from the surface of the rotating component in a pair of light pipes coupled to the probe body, wherein the pair of light pipes are physically decoupled from the at least two sensor assemblies.

20. The method of claim 15, wherein each radiation source of the pair of radiation sources includes an optical fiber, and further comprising, for each sensor assembly, coupling a focusing lens to an output end of the optical fiber such that the radiation is directed through the focusing lens prior to be directed through the plurality of prisms.

* * * * *